United States Patent
Lu et al.

(10) Patent No.: US 8,130,780 B2
(45) Date of Patent: Mar. 6, 2012

(54) METHOD AND APPARATUS FOR ASSIGNING RESOURCES IN A WIRELESS SYSTEM WITH MULTIPLE REGIONS

(75) Inventors: Jianmin Lu, San Diego, CA (US);
Anthony C.K. Soong, Plano, TX (US);
Yunsong Yang, San Diego, CA (US);
Sean Michael McBeath, Keller, TX (US)

(73) Assignee: Futurewei Technologies, Inc., Plano, TX (US)

( * ) Notice: Subject to any disclaimer, the term of this patent is extended or adjusted under 35 U.S.C. 154(b) by 789 days.

(21) Appl. No.: 12/135,930

(22) Filed: Jun. 9, 2008

(65) Prior Publication Data
US 2008/0310364 A1 Dec. 18, 2008

Related U.S. Application Data

(60) Provisional application No. 60/944,466, filed on Jun. 15, 2007, provisional application No. 60/944,462, filed on Jun. 15, 2007, provisional application No. 60/944,469, filed on Jun. 15, 2007, provisional application No. 60/944,477, filed on Jun. 15, 2007.

(51) Int. Cl.
*H04J 4/00* (2006.01)
(52) U.S. Cl. ........................ 370/436; 370/478
(58) Field of Classification Search .......... 370/208, 370/203, 322, 329, 330, 341, 349, 278, 282, 370/431, 436, 439, 478
See application file for complete search history.

(56) References Cited

U.S. PATENT DOCUMENTS

| | | | |
|---|---|---|---|
| 6,377,572 B1 | 4/2002 | Dolan et al. | |
| 6,404,325 B1 | 6/2002 | Heinrich et al. | |
| 6,597,919 B1 | 7/2003 | Kumar et al. | |
| 6,907,246 B2 | 6/2005 | Xu et al. | |
| 7,116,240 B2 | 10/2006 | Hyde | |
| 7,215,251 B2 | 5/2007 | Hyde | |
| 7,706,323 B2 | 4/2010 | Stopler et al. | |
| 2003/0221012 A1 | 11/2003 | Herrmann et al. | |
| 2004/0145454 A1 | 7/2004 | Powell et al. | |
| 2005/0201269 A1 | 9/2005 | Shim et al. | |

(Continued)

FOREIGN PATENT DOCUMENTS

CN 1536794 A 10/2004

(Continued)

OTHER PUBLICATIONS

"Medium Access Control Layer for Ultra Mobile Broadband (UMB) Air Interface Specification," 3$^{rd}$ Generation Partnership Project 2, 3GPP2 C.S0084-0020-0, Version 2.0, Aug. 2007, 157 pages, 3GPP2.

(Continued)

*Primary Examiner* — Brenda H Pham
(74) *Attorney, Agent, or Firm* — Slater & Matsil, L.L.P.

(57) ABSTRACT

A method and apparatus of signaling radio resource allocation in a wireless communication system includes transmitting at least one region boundary to a mobile station indicating a division of the time-frequency resources into at least two regions, determining a time-frequency resource assignment for the mobile station, transmitting an indication of the determined time-frequency resource to the mobile station in the same region as the determined time-frequency resource, and transmitting a packet to the mobile station using the physical time-frequency resources corresponding to the determined time-frequency resource.

20 Claims, 14 Drawing Sheets

U.S. PATENT DOCUMENTS

| | | |
|---|---|---|
| 2005/0281228 A1 | 12/2005 | Oh et al. |
| 2006/0039274 A1 | 2/2006 | Park et al. |
| 2006/0133312 A1 | 6/2006 | Harrison Teague et al. |
| 2006/0209754 A1 | 9/2006 | Ji et al. |
| 2006/0293076 A1 | 12/2006 | Julian et al. |
| 2007/0058523 A1 | 3/2007 | Cho et al. |
| 2007/0060178 A1 | 3/2007 | Gorokhov et al. |
| 2007/0076670 A1 | 4/2007 | Kuchibhotla et al. |
| 2007/0097910 A1 | 5/2007 | Ji et al. |
| 2007/0206561 A1 | 9/2007 | Son et al. |
| 2007/0217370 A1 | 9/2007 | Soong et al. |
| 2007/0230412 A1 | 10/2007 | McBeath et al. |
| 2007/0274288 A1 | 11/2007 | Smith et al. |
| 2007/0286066 A1 | 12/2007 | Zhang et al. |
| 2007/0291708 A1 | 12/2007 | Rao |
| 2008/0004029 A1 | 1/2008 | Moilanen |
| 2008/0025247 A1 | 1/2008 | McBeath et al. |
| 2008/0025337 A1 | 1/2008 | Smith et al. |
| 2008/0034274 A1 | 2/2008 | Song et al. |
| 2008/0037496 A1 | 2/2008 | Smith et al. |
| 2008/0043615 A1 | 2/2008 | Li et al. |
| 2008/0062936 A1 | 3/2008 | He et al. |
| 2008/0062944 A1 | 3/2008 | Smith et al. |
| 2008/0084843 A1 | 4/2008 | Gorokhov et al. |
| 2008/0146241 A1 | 6/2008 | Das et al. |
| 2008/0192847 A1 | 8/2008 | Classon et al. |
| 2008/0240034 A1 | 10/2008 | Gollamundi |
| 2009/0022098 A1 | 1/2009 | Novak et al. |
| 2009/0047912 A1* | 2/2009 | Lee et al. ................... 455/69 |
| 2009/0075667 A1 | 3/2009 | Bourlas |

FOREIGN PATENT DOCUMENTS

| | | |
|---|---|---|
| CN | 1780188 A | 5/2006 |
| CN | 1968452 A | 5/2007 |
| CN | 101102142 A | 1/2008 |
| EP | 1 786 220 A1 | 5/2007 |
| WO | WO 2006/001658 A1 | 1/2006 |
| WO | WO 2006/096887 A1 | 9/2006 |
| WO | WO 2006/099577 A1 | 9/2006 |
| WO | WO 2006/113873 A2 | 10/2006 |
| WO | WO 2006/137708 A1 | 12/2006 |

OTHER PUBLICATIONS

McBeath, S., et al., "Efficient Signaling for VoIP in OFDMA," 2007 Wireless Communications and Networking Conference, Mar. 11-15, 2007, 6 pages, IEEE.

McBeath, S., et al., "Efficient Bitmap Signaling fo VoIP in OFDMA," 2007 Vehicular Technology Conference, Sep. 30, 2007-Oct. 3, 2007, 5 pages, IEEE.

Bourlas, Y., et al., "Persistent Allocation Updated Procedures," IEEE 802.16 Broadband Wireless Access Working Group, IEEE P802.16Rev2/D4, Apr. 19, 2008, pp. 1-50, IEEE.

Written Opinion of the International Searching Authority, App. No. PCT/CN2008/071325, Date of mailing: Sep. 18, 2008, 5 pages.

Written Opinion of the International Searching Authority, App. No. PCT/CN2008/071317, Date of mailing: Sep. 18, 2008, 4 pages.

First Chinese Office Action, Chinese Application No. 200880001172.3, Dated: Jul. 1, 2010, 6 pages.

Second Chinese Office Action, Chinese Application No. 200880001172.3, Dated. Feb. 28, 2011, 9 pages.

"Text Proposal for Downlink OFDMA Resource Allocation and Mapping Rules for Distributed Mode Users in E-UTRA, with Discussion on Control Information," 3GPP TSG RAN WG1 #45, R1-061149, May 8-12, 2006, pp. 1-8.

US Provisional Application 60/888,833, Classon et al., filed Feb. 8, 2007, the specification and drawings.

"Technical Specification Group Radio Access Network; Physical Layer Aspects for Evolved UTRA (Release 7)," $3^{rd}$ Generation Project, 3GPP TR 25.814, V1.3.1, May 2006, pp. 6-11.

Third Chinese Office Action, Chinese Application No. 200880001172.3, Jun. 15, 2011, 9 pages.

* cited by examiner

| Parameter Name | Number of Bits |
|---|---|
| Connection Identifier | 16 |
| Region Identifier | 3 |
| Channel Identifier | 7 |
| MIMO | 4 |
| Modulation/Coding | 4 |

FIGURE 9

METHOD AND APPARATUS FOR ASSIGNING RESOURCES IN A WIRELESS SYSTEM WITH MULTIPLE REGIONS

This application claims priority to U.S. Provisional Patent Application No. 60/944,466 filed Jun. 15, 2007, entitled "Method and Apparatus For Assigning Resources In A Wireless System with Multiple Regions" which application is hereby incorporated herein by reference.

CROSS-REFERENCE TO RELATED APPLICATIONS

This application is related to the following provisional U.S. patent applications, each of which is incorporated herein by reference: U.S. Provisional Patent Application No. 60/944,462 filed Jun. 15, 2007; U.S. Provisional Patent Application No. 60/944,469 filed Jun. 15, 2007; and U.S. Provisional Patent Application No. 60/944,477 filed Jun. 15, 2007. Further, this application is related to the following non-provisional patent applications, each of which is incorporated herein by reference: U.S. patent application Ser. No. 12/134,025, filed Jun. 5, 2008; U.S. patent application Ser. No. 12/135,599, filed Jun. 9, 2008; and U.S. patent application Ser. No. 12/135,916, filed Jun. 9, 2008.

FIELD OF THE INVENTION

The present invention generally relates to allocation of radio resources for transmission in a wireless communication system. Specifically, the present invention relates to a novel method of signaling the allocation of radio resources for transmission in, e.g., orthogonal frequency division multiplexing (OFDM) and orthogonal frequency division multiple access (OFDMA) communication systems and the resulting systems. Even more specifically, the present invention relates to improved efficiency in assigning time-frequency resources to one or more mobile stations.

BACKGROUND OF THE INVENTION

In an OFDMA communication system, the time-frequency resources of the system are shared among a plurality of mobile stations. Since different mobile stations have different channel conditions, quality of service (QoS) requirements, and capabilities, in some OFDMA communication systems, the time-frequency resources are divided into multiple regions to facilitate different types of transmissions. For time division duplex (TDD) systems, the time domain is divided into a downlink (DL) region and an uplink (UL) region. In some systems, the DL region and UL region are further divided into additional regions. For example, the DL may be divided into a partial usage of subcarriers (PUSC) region and a full usage of subcarriers (FUSC) region such as described by the IEEE 802.16 standard. Mobile stations assigned to the DL PUSC region experience less interference than mobile stations assigned to the DL FUSC region. Therefore, the DL PUSC region is often advantageous for mobile stations near the cell edge. The DL FUSC region utilizes the entire bandwidth in each sector, thereby maximizing the spectral efficiency. The DL FUSC region is advantageous for those mobile stations that can tolerate increased interference relative to what would be seen in the DL PUSC region and is therefore advantageous for mobile stations near the base station.

The base station assigns resources to mobile stations using an assignment message, which is transmitted as part of a control channel. The assignment message typically contains an indication of the assigned channel (channel identifier) and other parameters related to the transmission of a particular packet or series of packets. If multiple regions exist, it is known for the assignment message to explicitly indicate the region, either through additional bits in the overhead message or by embedding the region information in the channel identifier. An indication of the region, whether explicitly indicated or included as part of the channel identifier, creates additional control channel overhead. For wireless systems, it is essential that control channel overhead be carefully managed. Thus, there is a need for assigning time-frequency resources in a system with multiple regions without indicating the region.

SUMMARY OF THE INVENTION

In one aspect, the present invention provides for a method of assigning time-frequency resources in a wireless communication system. The method includes transmitting at least one region boundary to a mobile station, the at least one region boundary indicating a division of the time-frequency resources into at least two regions, and determining a time-frequency resource assignment for the mobile station. The method further includes transmitting an indication of the determined time-frequency resource assignment to the mobile station in a same region as the determined time-frequency resource, and transmitting a packet to the mobile station using the physical time-frequency resources corresponding to the determined time-frequency resource.

In another aspect, the present invention provides for a method of receiving a radio resource assignment in a wireless communication system including receiving at least one region boundary indicating a division of the radio resources into at least two regions, processing a control channel in a first one of the at least two regions, and receiving a radio resource assignment in the first one of the at least two regions. The method further includes receiving a communication packet on the physical radio corresponding to the received time-frequency resource assignment in the first one of the at least two regions.

In yet another aspect, the present invention provides for a base station. The base includes a microprocessor and a computer readable medium storing programming for execution by the processor. The programming includes instructions to define a first region and a second region of time-frequency resources, including defining a boundary between the first region and the second region of time-frequency resources direct the transmission of the definition of a first region and a second region of time-frequency resources to a mobile station during the first region of time-frequency resources. The programming includes further instructions to define a time-frequency resource assignment for the mobile station, and direct the transmission of the definition of the time-frequency resource assignment to the mobile station during the first region of time-frequency resources; and direct the transmission of a communication packet to the mobile station using the physical time-frequency resources corresponding to the determined time-frequency resources during the first region of time-frequency resources.

An advantageous feature of the present invention is that signaling overhead can be lessened by transmitting a time-frequency resource assignment and a time-resource region definition in the actual time-resource region.

BRIEF DESCRIPTION OF THE DRAWINGS

FIG. 9 is an exemplary assignment message;

DETAILED DESCRIPTION OF ILLUSTRATIVE EMBODIMENTS

The present disclosure can be described by the embodiments given below. It is understood, however, that the embodiments below are not necessarily limitations to the present disclosure, but are used to describe a typical implementation of the invention.

The present invention provides a unique method and apparatus for assigning resources in a wireless system with multiple regions. It is understood, however, that the following disclosure provides many different embodiments, or examples, for implementing different features of the invention. Specific examples of components, signals, messages, protocols, and arrangements are described below to simplify the present disclosure. These are, of course, merely examples and are not intended to limit the invention from that described in the claims. Well known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry described herein are omitted, as such control circuits are within the skills of persons of ordinary skill in the relevant art.

Figure 1:
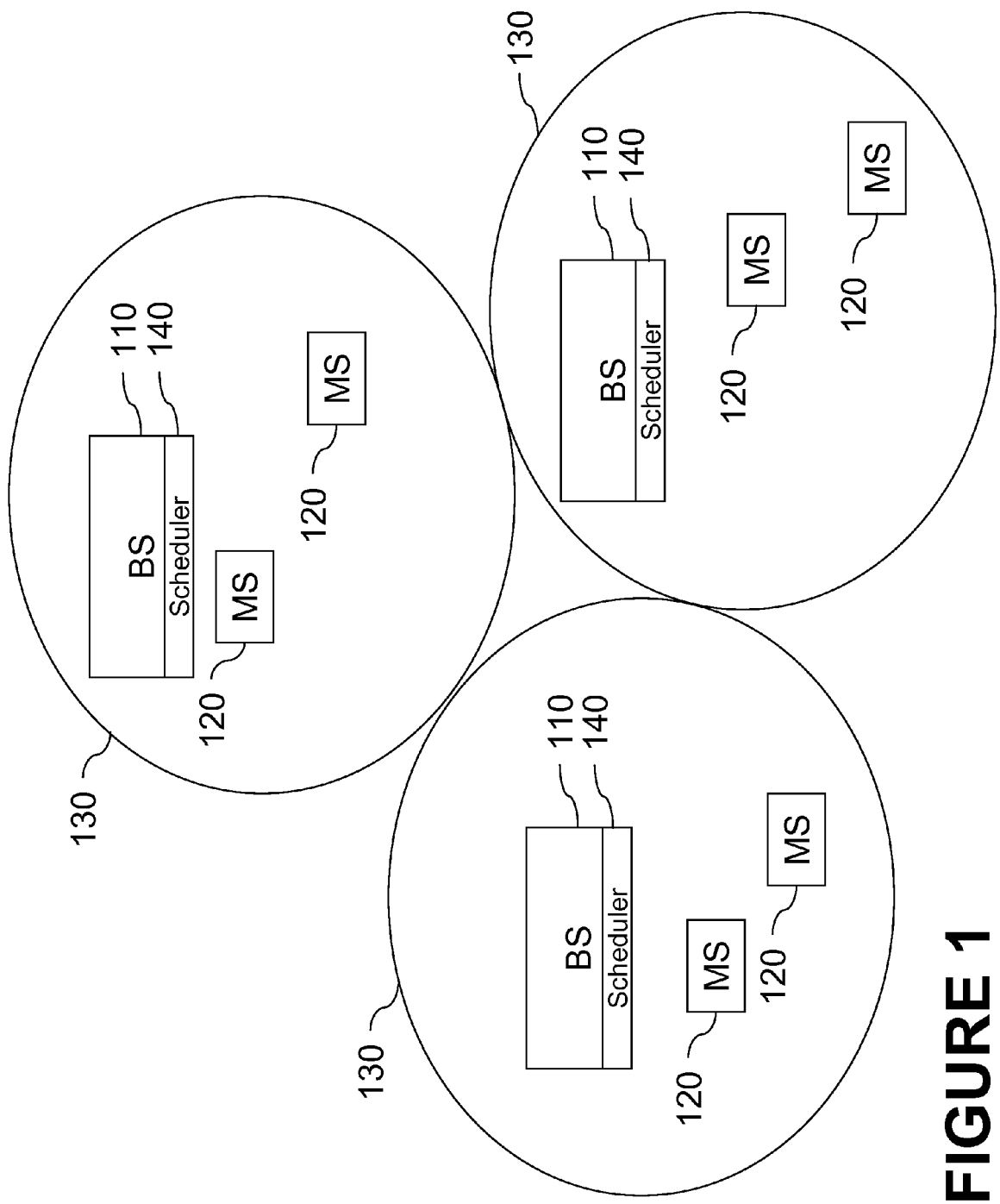
FIG. 1 illustrates a wireless communications network.

FIG. 1 is a wireless communications network comprising a plurality of base stations (BS) 110 providing voice and/or data wireless communication service to respective pluralities of mobile stations (MS) 120. A BS is also sometimes referred to by other names such as access network (AN), access point (AP), Node-B, etc. Each BS has a corresponding coverage area 130. Referring to FIG. 1, each base station includes a scheduler 140 for allocating radio resources to the mobile stations. Exemplary wireless communication systems include, but are not limited to, Evolved Universal Terrestrial Radio Access (E-UTRA) networks, Ultra Mobile Broadband (UMB) networks, IEEE 802.16 networks, and other OFDMA based networks. In some embodiments, the network is based on a multiple access scheme other than OFDMA. For example, the network can be a frequency division multiplex access (FDMA) network wherein the time-frequency resources are divided into frequency intervals over a certain time interval, a time division multiplex access (TDMA) network wherein the time-frequency resources are divided into time intervals over a certain frequency interval, and a code division multiplex access (CDMA) network wherein the resources are divided into orthogonal or pseudo-orthogonal codes over a certain time-frequency interval.

Figure 2:
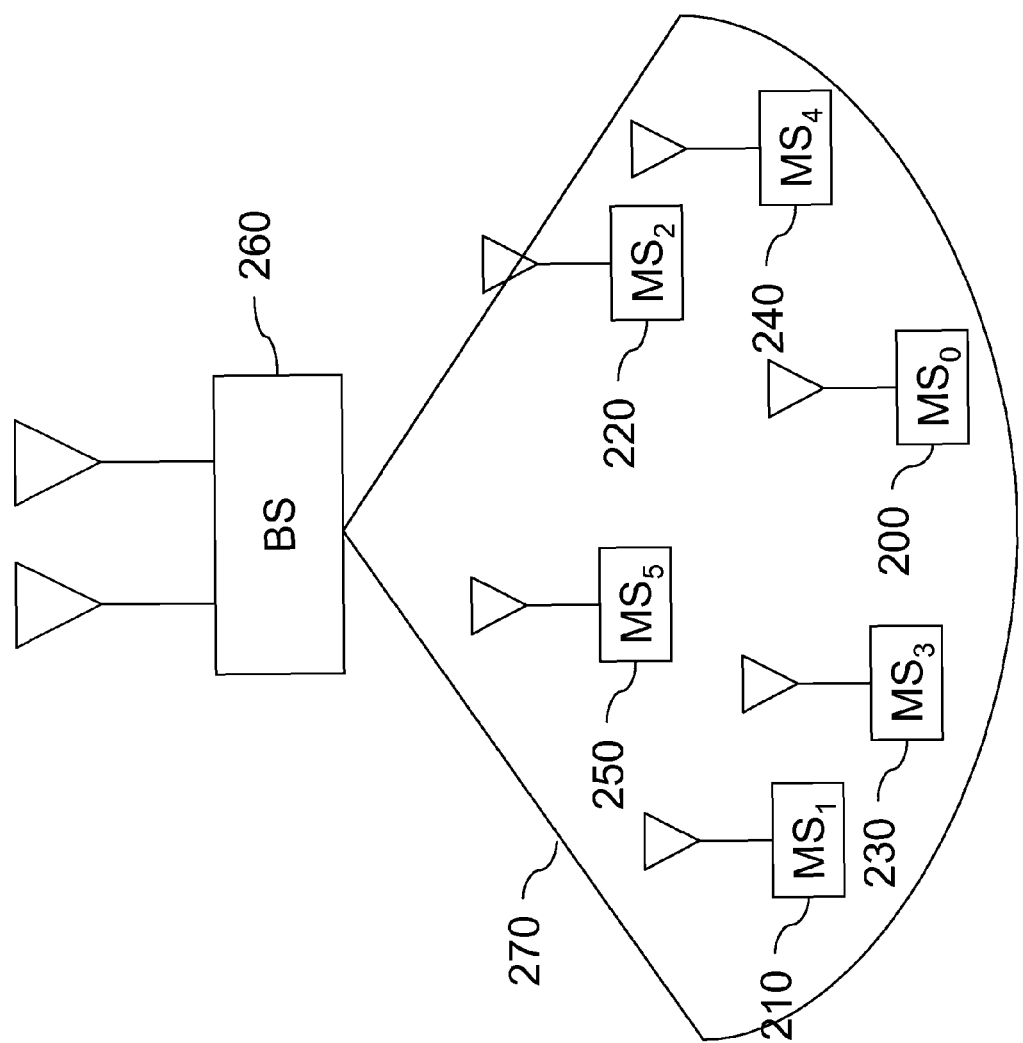
FIG. 2 illustrates a base station and several mobile stations from a wireless communications network.

FIG. 2 illustrates one base station and several mobile stations from the wireless communications network of FIG. 1. As is known in the art, the coverage area, or cell, of a base station 260 can be divided into, typically, three sub-coverage areas or sectors, one of which is shown 270. Six exemplary mobile stations 200, 210, 220, 230, 240, 250 are in the shown coverage area. The base station typically assigns each mobile station one or more connection identifiers (CID) (or another similar identifier) to facilitate time-frequency resource assignment. The CID assignment can be transmitted from the base station to the mobile station on a control channel, can be permanently stored at the mobile station, or can be derived based on a mobile station or base station parameter.

Figure 3:
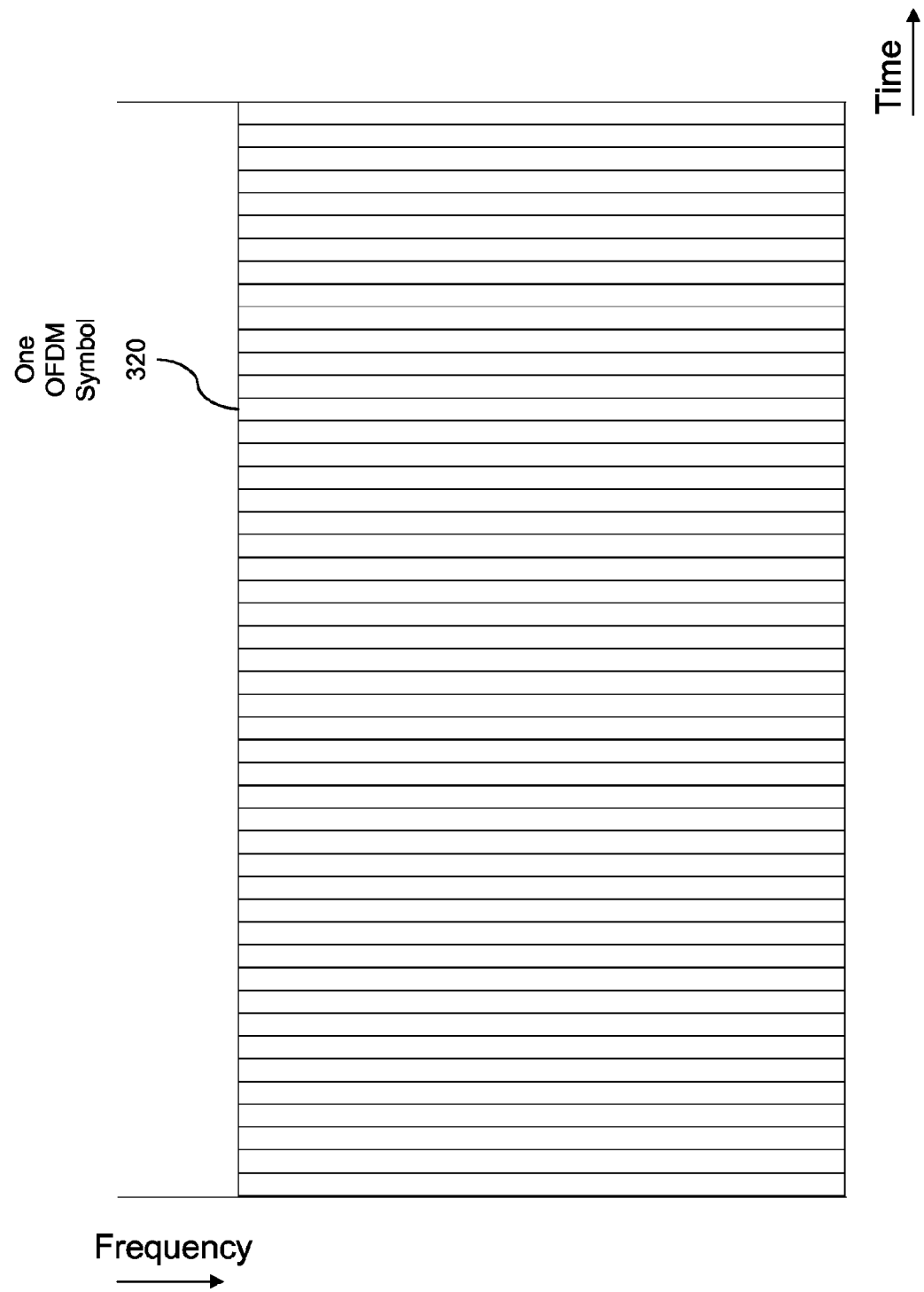
FIG. 3 illustrates an exemplary set of OFDMA time-frequency radio resources.

FIG. 3 schematically illustrates an exemplary set of OFDMA time-frequency radio resources. In OFDMA systems, the time-frequency resources are divided into OFDM symbols and OFDM subcarriers for allocation to respective mobile stations by a base station scheduler. In an exemplary OFDMA system, the OFDM subcarriers are approximately 10 kHz apart and the duration of each OFDM symbol is approximately 100 μsec. FIG. 3 illustrates one 5 msec frame of an OFDMA system, such as that defined by the IEEE 802.16e standard. Referring to FIG. 3, in this exemplary embodiment, resources in the time domain (x-axis) are divided into 48 OFDM symbols 320. In the frequency domain (y-axis), the resources are divided into multiple subchannels (not shown), wherein the size of the subchannel depends on the subcarrier permutation scheme, as will be discussed in more detail later.

Figure 4:
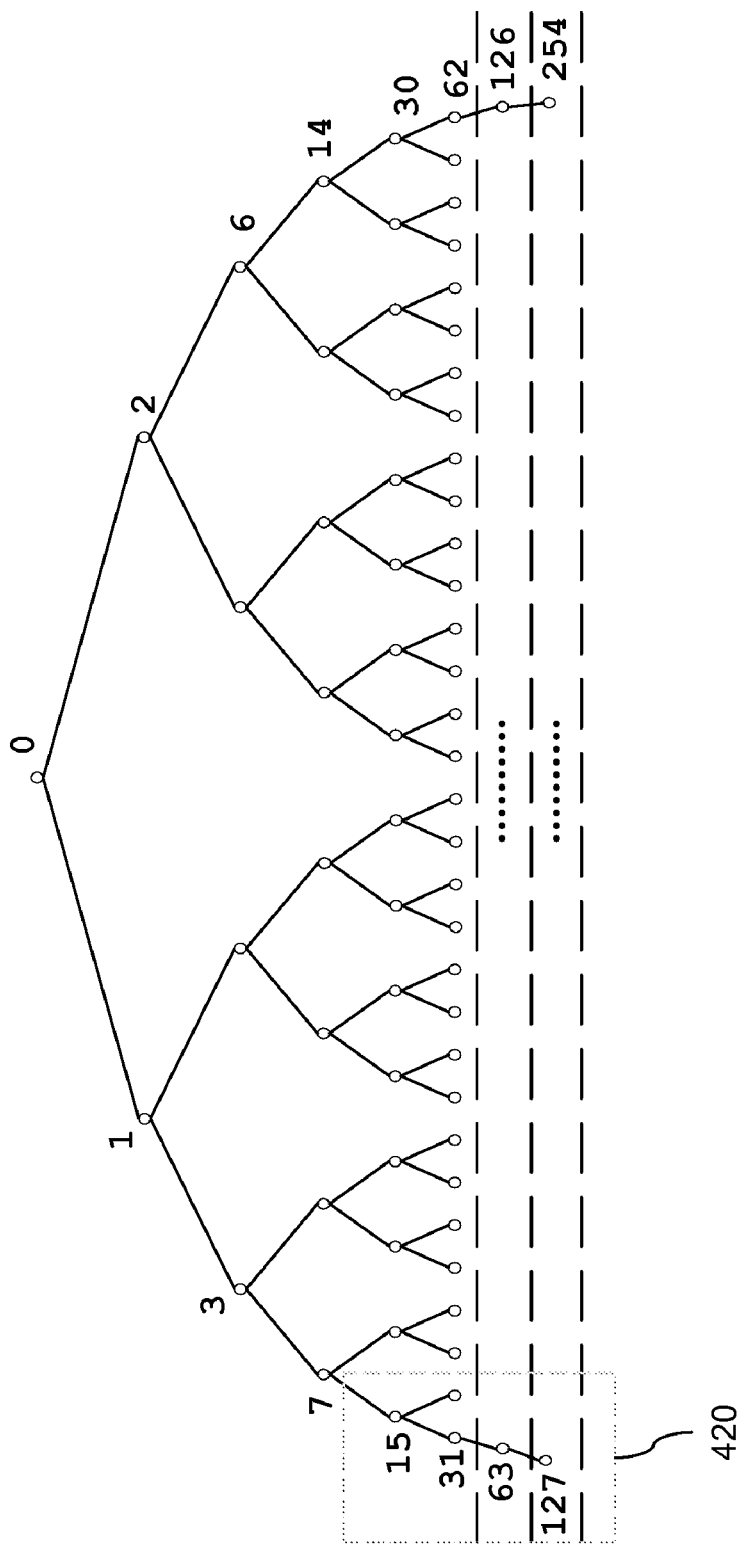
FIGS. 4-5 illustrate an example channel tree.
Figure 5:
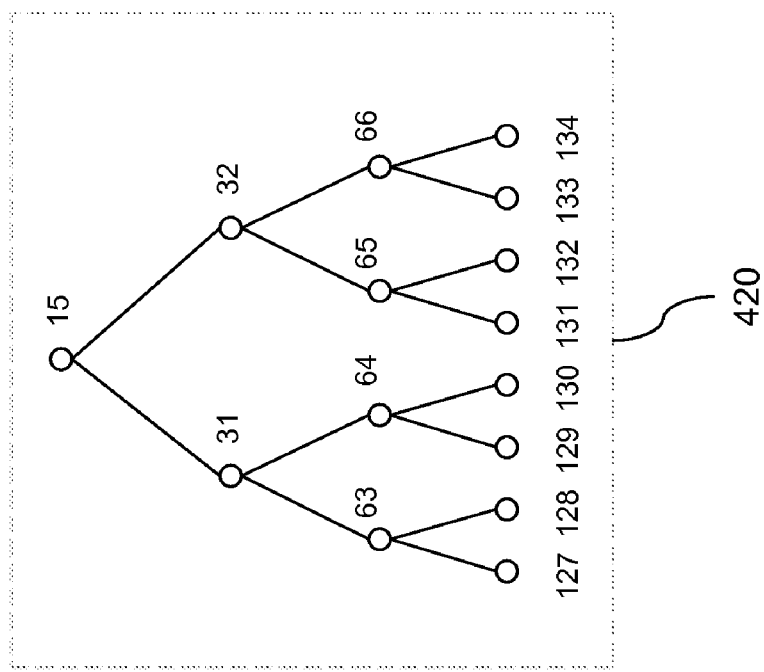

FIGS. 4-5 illustrate an exemplary channel tree, which is used to logically illustrate the division of time-frequency resources. Referring to FIG. 4, the main parent node, labeled as node 0, represents the entire set of time-frequency resources. In this channel tree, each node is sub-divided into two nodes. Therefore, the main parent node, node 0, is sub-divided into parent nodes 1 and 2. Parent nodes 1 and 2 each represent fifty percent of the entire set of time-frequency resources. The lowest level nodes (nodes 127, 128, 129, ..., 254) are referred to as base nodes. A base node represents the smallest time-frequency resource that can be allocated to a mobile station using the channel tree. The collection of nodes under parent node 15, enclosed by 420, is enlarged and depicted in FIG. 5. Referring to FIG. 5, parent node 15 is divided into parent nodes 31 and 32. Parent node 31 is divided into parent nodes 63 and 64, and parent node 32 is divided into parent nodes 65 and 66. Parent node 63 is divided into base nodes 127 and 128, parent node 64 is divided into base nodes 129 and 130, parent node 65 is divided into base nodes 131 and 132, and parent node 66 is divided into base nodes 133 and 134.

Each channel tree node corresponds to a physical portion of the time-frequency resources. For example, consider an OFDMA system containing 384 useful subcarriers, indexed 0 to 383. In one exemplary channel tree configuration, node 0 corresponds to subcarriers 0 through 383, node 1 corresponds to subcarriers 0 through 191, and node 2 corresponds to subcarrier 192 through 384. In another exemplary channel tree configuration, node 0 corresponds to subcarriers 0 through 383, node 1 corresponds to subcarriers 0, 2, 4, . . . , 382, and node 2 corresponds to subcarrier 1, 3, 5, . . . , 383. The mapping of logical channel tree nodes to physical time-frequency resources may change with time and may be different in different sectors. Any mapping of logical channel tree nodes to physical time-frequency resources is possible, as long as the mapping scheme is known at the base station and the mobile station. The mapping scheme can be stored at a base station and a mobile station, transmitted to a mobile station from a base station, determined at a mobile station based on a parameter received from a base station, combinations of the above, and the like.

Figure 6:
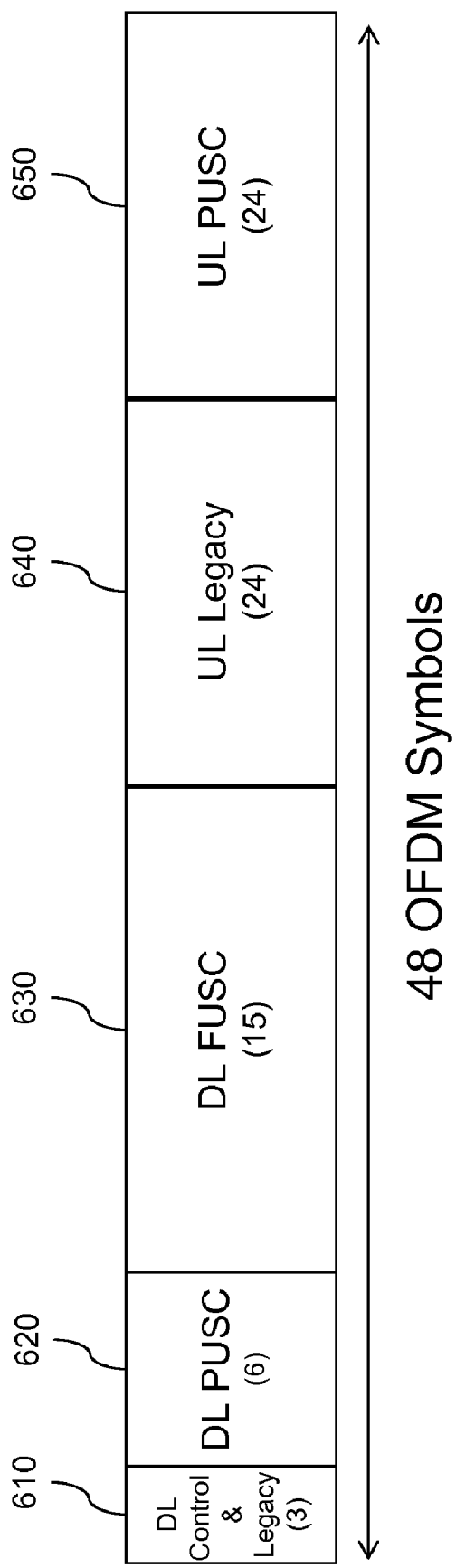
FIG. 6 illustrates the division of the time domain into downlink control and legacy, downlink PUSC, downlink FUSC, uplink legacy, and uplink PUSC regions.

FIG. 6 illustrates the division of the time domain into three downlink regions 610, 620, and 630 and two uplink regions 640, 650. Referring to FIG. 3, note that there are 48 OFDM symbols in each 5 msec frame. First DL region 610 is denoted the DL control and legacy region and preferably has a duration of 3 OFDM symbols. Second DL region 620 is denoted the DL PUSC region and preferably has a duration of 6 OFDM symbols. Third DL region 630 is denoted the DL FUSC region and preferably has a duration of 15 OFDM symbols. First UL region 640 is denoted the UL legacy region and has a duration of 24 OFDM symbols in the illustrated example. Second UL region 650 is denoted the UL PUSC region and has a duration of 24 OFDM symbols in the illustrated example. Note that the guard interval between the DL and UL regions is ignored for illustration, although those skilled in the art will recognize the need and typical configuration of a guard region in the frame. Referring to FIG. 6, the three DL regions contain 24 OFDM symbols collectively, and the two UL regions contain 24 OFDM symbols collectively. As will be discussed in more detail later, preferred embodiments of the invention provide a new control mechanism. Some mobile stations, denoted new mobile stations, in the system will be able to interpret this new control mechanism while other mobile stations, denoted legacy mobile stations, in the system will not be able to interpret this new control mechanism. In FIG. 6, the legacy mobile stations will be served in DL legacy region 610 and UL legacy region 650, as is known in the art.

Within each region, subcarrier permutations are defined by the base station. DL PUSC, DL FUSC, and UL PUSC are exemplary subcarrier permutations schemes defined in the IEEE 802.16 standard. Other permutation schemes are also defined in the IEEE 802.16 standard; DL PUSC, DL FUSC, and UL PUSC are merely used to illustrate the invention. Any subcarrier permutation scheme could be used in each region. For exemplary DL PUSC region 620, there are preferably 360 data subcarriers divided into 15 subchannels, wherein each subchannel has 24 subcarriers. For DL PUSC region 620, the base station preferably assigns an even number of OFDM symbols for each subchannel. For exemplary DL FUSC region 630, there are preferably 384 data subcarriers divided into 8 subchannels, wherein each subchannel has 48 subcarriers. For exemplary UL PUSC region 650, there are preferably 408 subcarriers (data plus pilot) divided into 17 subchannels, wherein each subchannel has 24 subcarriers (16 data plus 8 pilot). For UL PUSC, the number of OFDM symbols for each subchannel is preferably a multiple of 3.

Figure 7:
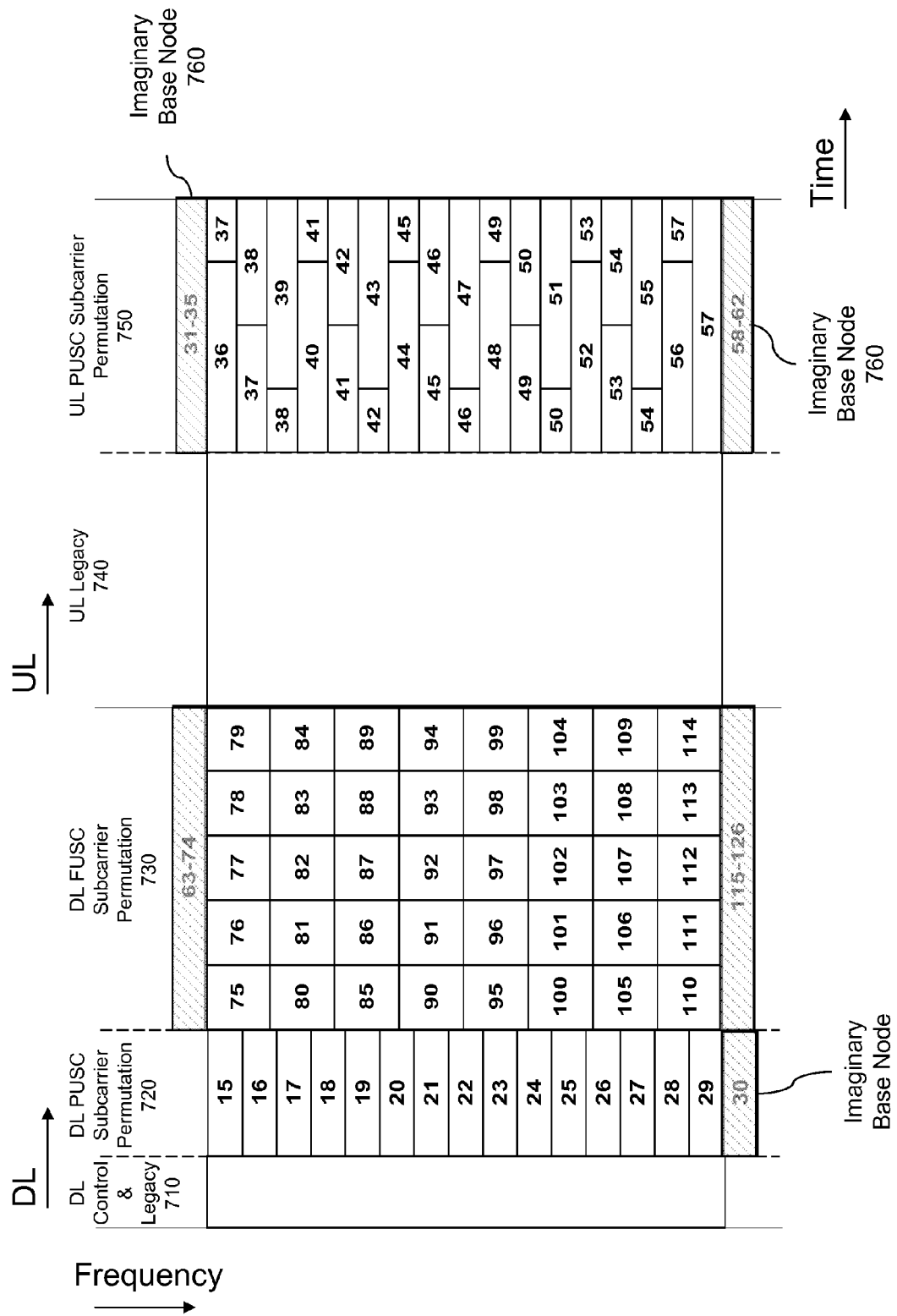
FIG. 7 illustrates an exemplary base node numbering scheme for the regions defined in FIG. 6.

Once regions are defined, the base station transmits assignment messages to mobile stations to indicate particular time-frequency resource assignments. There are several ways for allocating radio resources. FIG. 7 provides an exemplary technique for allocating radio resources, wherein the time-frequency resources are divided into base nodes and a channel tree structure, such as the channel tree structure of FIGS. 4-5, is used to indicate time-frequency resource assignments. Referring to FIG. 7, unique channel trees are preferably used in each region. DL PUSC region 720 has base nodes numbered 15-30, DL FUSC region 730 has base nodes 63-126, and UL PUSC region 750 has base nodes numbered 31-62. Some of the base nodes are imaginary base nodes 760, wherein imaginary base nodes 760 are used to maintain a tree structure and do not correspond to any physical time-frequency resources. DL control and legacy region 710 and UL legacy region 740 are not shown to have channel trees, since legacy mobile stations will typically not be able to interpret the channel tree, although a channel tree can be defined in these regions for the mobile stations that do understand the channel tree in order to multiplex new mobile stations with legacy mobile stations. Within each region, a channel tree is constructed with the size of the channel tree dependent on the size of the region and the size of a base node. These parameters determine the number of base nodes in the region, and therefore the overall size of the channel tree. For example, the channel tree in DL PUSC region 720 is 5 levels "deep" (referring back to FIG. 4, it can be seen that parent node 0 is at a first level, nodes 1 and 2 are at a second level, nodes 3-6 are at a third level, nodes 7-14 are at a fourth level, and nodes 15-30 are at a fifth level), and can be indexed with 5 bits. The channel tree in DL FUSC region 730 has 7 levels and can be index with 7 bits.

Figure 8:
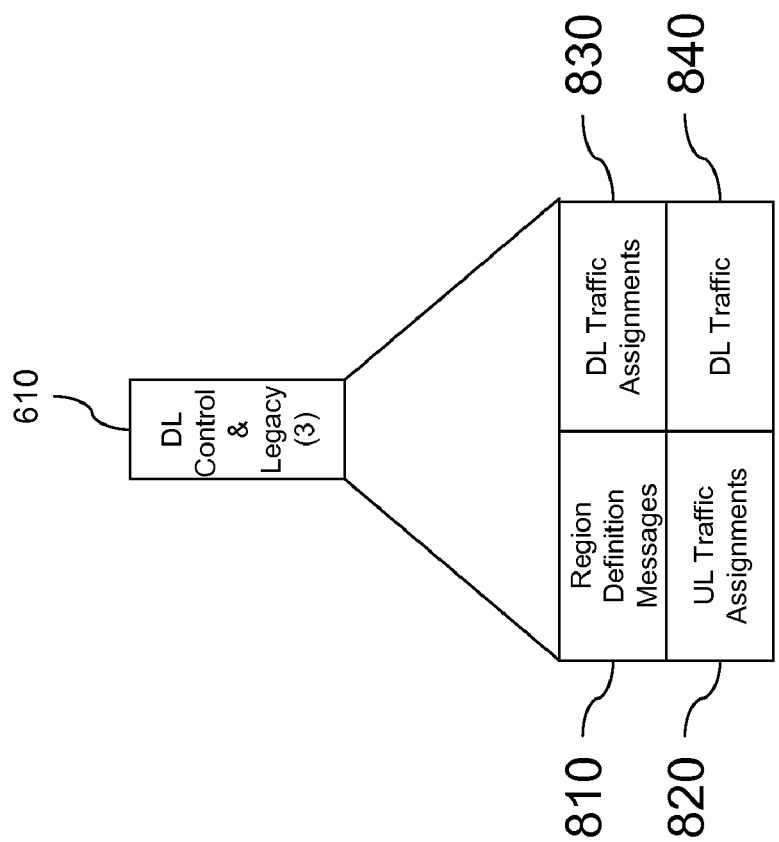
FIG. 8 illustrates exemplary information transmitted in a downlink control and legacy region according to one embodiment of the present invention.

To establish the regions of FIGS. 6-7, the base station transmits one more region definition messages to the mobile stations. FIG. 8 provides an exemplary location for transmitting the region definition messages. Referring to FIG. 8, DL control and legacy region 610 preferably contain four types of information (as well as other information not shown). First, DL control and legacy region 610 contains one or more region definition messages 810, one or more DL traffic assignments 830, one or more UL traffic assignments 820, and one or more DL traffic transmission 840. Region definition messages 810 may contain one or more of the following: region starting point, region ending point, region width, and region subcarrier permutation. Region definitions can be dependent on other each other or can be independent. For example, referring to FIGS. 6-7, a base station can transmit an indication of OFDM symbol 3 and an indication of the DL PUSC subcarrier permutation using a region definition message 810 to define DL PUSC region 720. Likewise, a base station and can transmit an indication of OFDM symbol number 9 and an indication of the DL FUSC subcarrier permutation using a region definition message 810 to define DL FUSC region 730. The mobile stations preferably determine the ending point of DL PUSC region 720 based on the starting point of DL FUSC region 730. In other embodiments, the starting point of one region can be determined based upon the ending point of an adjacent region, as will be apparent to those skilled in the art. Alternatively, the base station can include the number of OFDM symbols in each region definition message 810 to eliminate the interdependence. Multiple regions can be defined in each region definition message 810 or each region definition message 810 can include one region definition.

Once a base station establishes regions, the base station transmits DL traffic assignments 830 and UL traffic assignments 820 in order to allocate time-frequency resources to the mobile stations. The assignments are typically generated in a base station scheduler (such as base station scheduler 140 illustrated in FIG. 1). FIG. 9 provides fields of an exemplary assignment message 910, which can be either DL traffic assignments 830 or UL traffic assignments 820. Referring to FIG. 9, the assignment message 910 preferably contains a 16 bit field indicating connection identifier 912 of the mobile station, wherein connection identifier 912 corresponds to one or more mobile stations. Typically, connection identifier 912 corresponds to a single mobile station, but in the case of a multi-cast or broadcast transmission, connection identifier 912 could correspond to several mobile stations. Note that, in some embodiments, connection identifier 912 is not included in assignment message 910, but is rather used to scramble assignment message 910. In this way, only the intended mobile station can correctly decode assignment message 910. Assignment message 910 also preferably contains a 3 bit region identifier field 913 and a 7 bit channel identifier field 914, wherein the region identifier corresponds to a region and the channel identifier corresponds to one of the nodes from a channel tree. Note that, in this example, channel identifier field 912 is preferably set to the maximum number of bits needed to represent the channel trees of FIG. 7, in order to have a constant assignment message 910 size. Assignment message 910 preferably also contains a multiple input multiple output (MIMO) field 915 for indicating parameters related to the MIMO scheme. MIMO field 915 is used to indicate the type of MIMO parameters used by a base station, such as precoding scheme, antenna configuration, and the like. Finally, assignment message 910 may contain a four bit field indicating modulation and coding 916 of the packet. It should be clear to those skilled in the art that there are a variety of ways of communicating the parameters delineated in FIG. 9. While one or more of these parameters are preferably communicated to the mobile station, not all parameters are used in all embodiments, and some parameters can be omitted based on the value of other parameters.

As an illustrative example of a DL traffic assignment 830, an exemplary base station can assign a mobile station with CID '0100100101010101' to channel tree node 29 (binary '0011101') in the DL PUSC region 720 (the DL PUSC region 720 is the second region where '000' corresponds to the first region, '001' corresponds to the second region, etc) using the assignment message 910. To make this assignment, the base station sets Connection Identifier field 912 to '0100100101010101', Region Identifier field 913 to '001', Channel Identifier field 914 to '0011101', and MIMO field 915 and modulation/coding field 916 to the appropriate values as is well known in the art.

Figure 10:
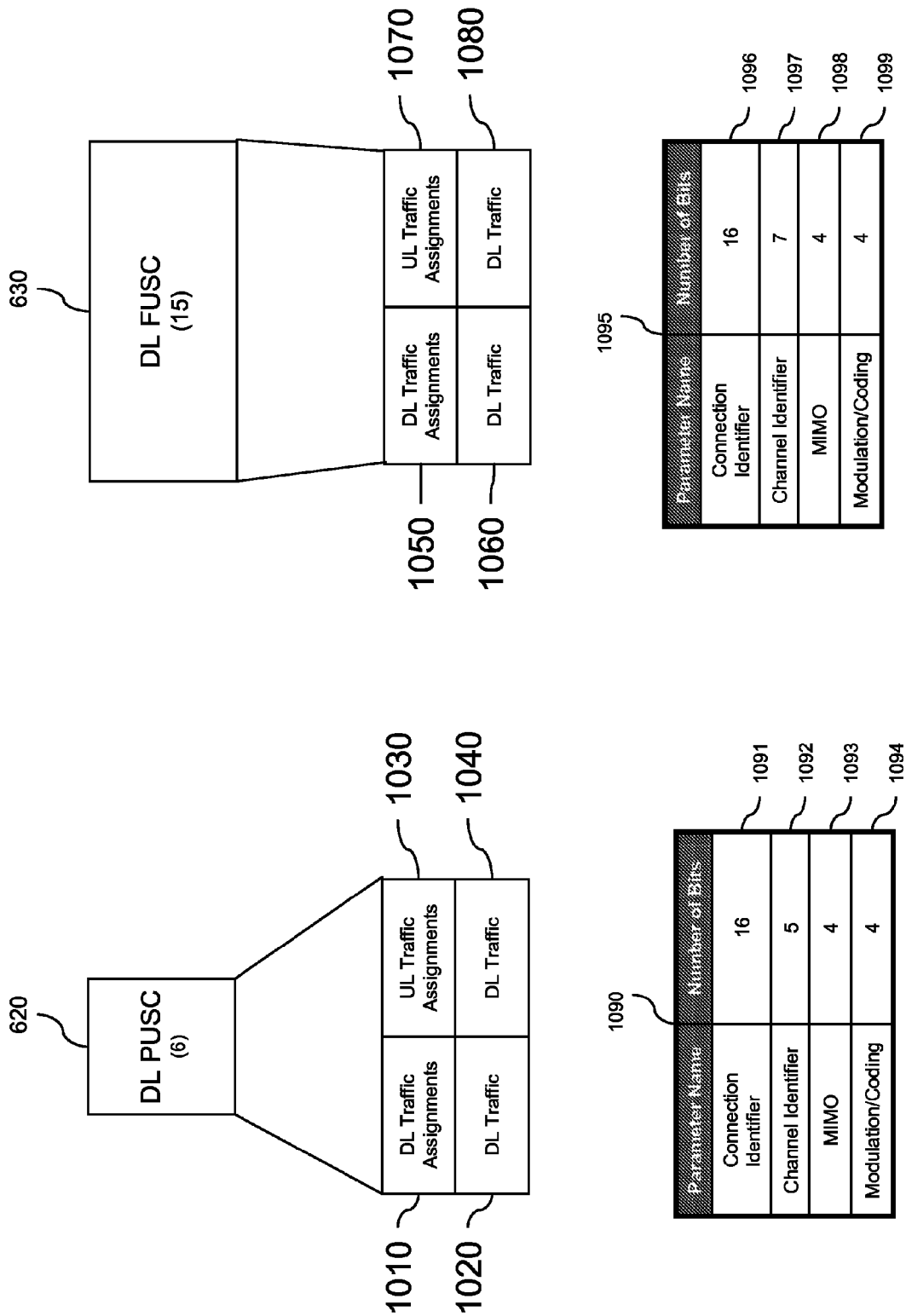
FIG. 10 illustrates exemplary information transmitted in each of exemplary downlink regions according to one embodiment of the present invention.

DL traffic assignments 830 and UL traffic assignments 820 represent a significant portion of the control channel overhead of the system. Since reducing control channel overhead is important for wireless communication systems, FIG. 10 illustrates a mechanism for reducing the control channel overhead by eliminating some of the bits in the assignment message 910. Referring to FIG. 10, DL traffic assignments 1010 and 1050 are moved from DL control legacy region 610 to each of DL PUSC region 620 and DL FUSC region 630, respectively. In this way, the base station does not need to transmit an indication of the region to the mobile station, since assignments for each region are carried within the region. In addition, the number of bits for indicating the channel identifier can be exactly what is needed to represent the channel tree in that specific region. Exemplary assignment messages 1090 and 1095 for DL PUSC 620 region and DL FUSC 630 region are provided to illustrate these advantages. Referring to FIG. 10, assignment message 1090 does not include a region identifier and includes 5 bits for indicating the channel identifier 1092. Assignment message 1095 does not include a region identifier and includes 7 bits for indicating the channel identifier 1097. Mobile stations determine the size of the assignment message in the respective region based on the parameters with fixed size (connection identifier, MIMO, Modulation/Coding) plus the parameters with a size that is dependent on the region definition (channel identifier). In some embodiments, certain fields are only included for certain region types. For example, the MIMO field could be omitted for DL PUSC regions.

Assignments for uplink transmissions are carried on the downlink. Therefore, each uplink region must be associated with a downlink region. For example, assignments for UL PUSC region 650 can be transmitted in DL FUSC region 630. These assignments can be made using the UL traffic assignments 1070 for DL FUSC region 630. The term corresponding regions will be used to denote the relationship between a DL region in which a UL assignment is made and a UL region in which a UL assignment is valid.

Figure 11:
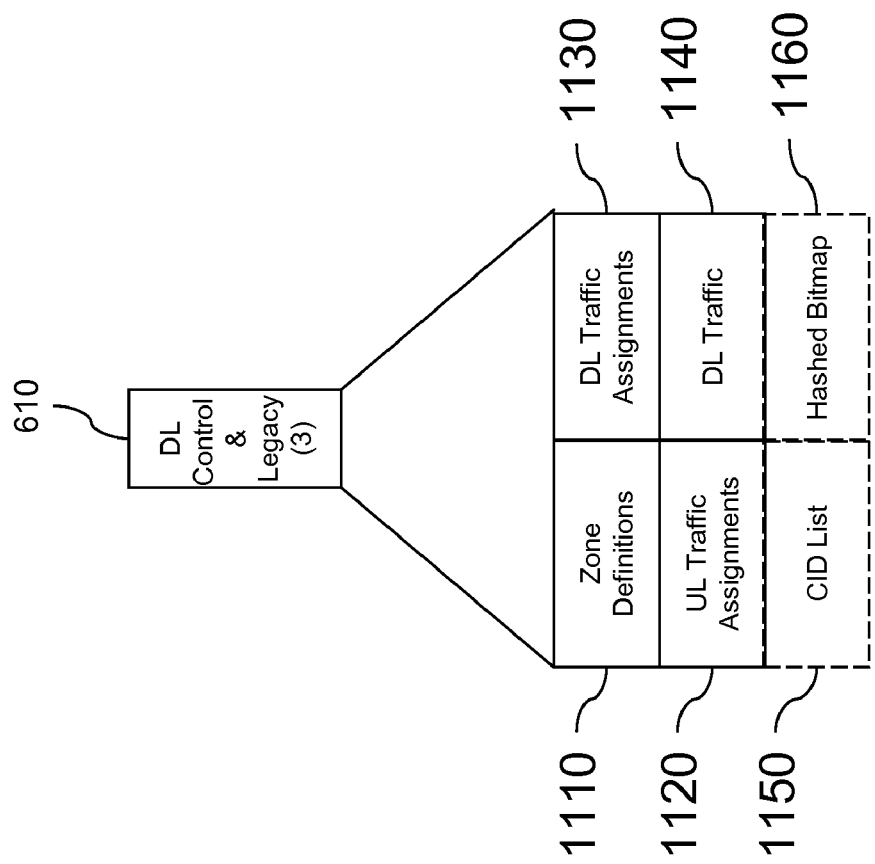
FIG. 11 illustrates exemplary information transmitted in a downlink control and legacy region according to one embodiment of the present invention.

If assignment messages are located within the same region as the data transmission, the mobile station must decode assignment messages in each region in order to determine if it is assigned a time-frequency resource. This is not as desirable as the case where assignment message are transmitted at the beginning of the frame, since this approach does not allow a mobile station to enter a reduced power mode after decoding the assignment message. To mitigate this problem, two solutions are proposed (at a beginning of a frame). FIG. 11 illustrates a preferred solution.

Referring to FIG. 11, the base station includes a CID list 1150 or a hashed bitmap 1160 in the DL control and legacy region 610. The mobile stations determine if they are assigned a time-frequency resource in the current frame by processing either the CID list 1150 or the hashed bitmap 1160. The CID list 1150 may only include the N least significant bits of each CID. When the CID list 1150 is transmitted in the DL control and legacy region 610, the mobile stations determine if their CID matches a CID from the CID list 1150. If so, the mobile stations process the DL traffic assignments in each region. If not, the mobile station can enter a reduced power state until the next frame. When the hashed bitmap 1160 is transmitted in DL control and legacy region 610, the mobile station apply a hashing algorithm to their CID and if a match is determined with one or more values in hashed bitmap 1160, the mobile station process the DL traffic assignments in each region. If not, the mobile station can enter a reduced power state until the next frame. Also shown in FIG. 11 are: field 1110, where zone definitions can be provided, field 1120, where UL traffic assignments are provided, field 1130 where DL traffic assignments are provided, and field 1140 wherein is provided the DL traffic.

Figure 12:
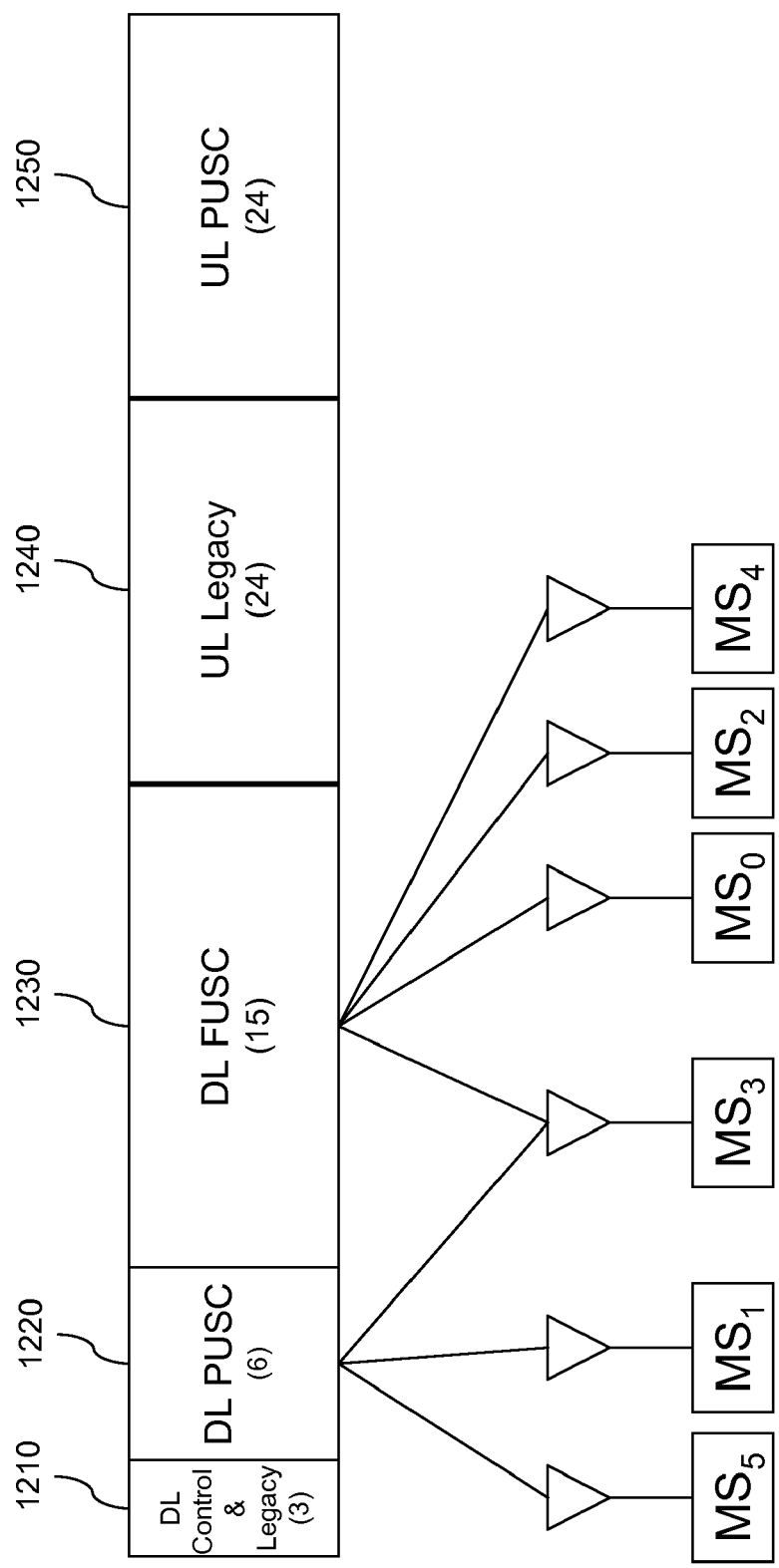
FIG. 12 illustrates exemplary assignment of preferred regions.

FIG. 12 illustrates an alternative solution to that illustrated in FIG. 11. In some embodiments, the overhead associated with CID list 1150 or hashed bitmap 1160 is not desirable. Therefore, each mobile station is assigned one or more preferred regions in this embodiment. The preferred region assignment is typically transmitted using higher layer signaling and can be a region identifier, region type, and the like. For example, a base station can indicate to a mobile station that its preferred region is "DL PUSC." Alternatively, a base can indicate to a mobile station that its preferred region is '001', where '001' corresponds to the second region. FIG. 12 provides exemplary assignments of preferred regions to multiple mobile stations. Referring to FIG. 12, $MS_5$ and $MS_1$ are each assigned DL PUSC region 1220 as their respective preferred region. $MS_3$ is assigned both DL PUSC region 1220 and DL FUSC region 1230 as its preferred regions. $MS_0$, $MS_2$, and $MS_4$ are each assigned DL FUSC region 1230 as their respective preferred region. Once the mobile stations are assigned a preferred region, the mobile stations then monitor the DL traffic assignments only in their respective preferred region(s). In some embodiments, each mobile station monitors the DL control and legacy region 1210, which allows base station to make assignments in any region using the normal assignment message, such as assignment message 910.

Once preferred regions are established as in FIG. 12, a base station can relocate an entire set of assignment messages to a new region, denoted the control region. Then, the mobile station processes the assignment messages under the hypothesis that the message has the fields associated with its preferred region(s). Again, in some embodiments, some of the field lengths are determined from the region length. If the mobile station is able to successfully decode the assignment message, it knows that the region for which the assignment is valid is the preferred region of the mobile station. If a mobile station has more than one preferred region, the base station can differentiate between the regions using unique scrambling, if the number of bits in the assignment messages for the multiple regions are the same. Exemplary UL region is preferably divided into a 24 symbol legacy UL region 1240 and a 24 symbol UL PUSC region 1250. One skilled in the art will recognize other configurations and permutations for UL region are equally possible.

Figure 13:
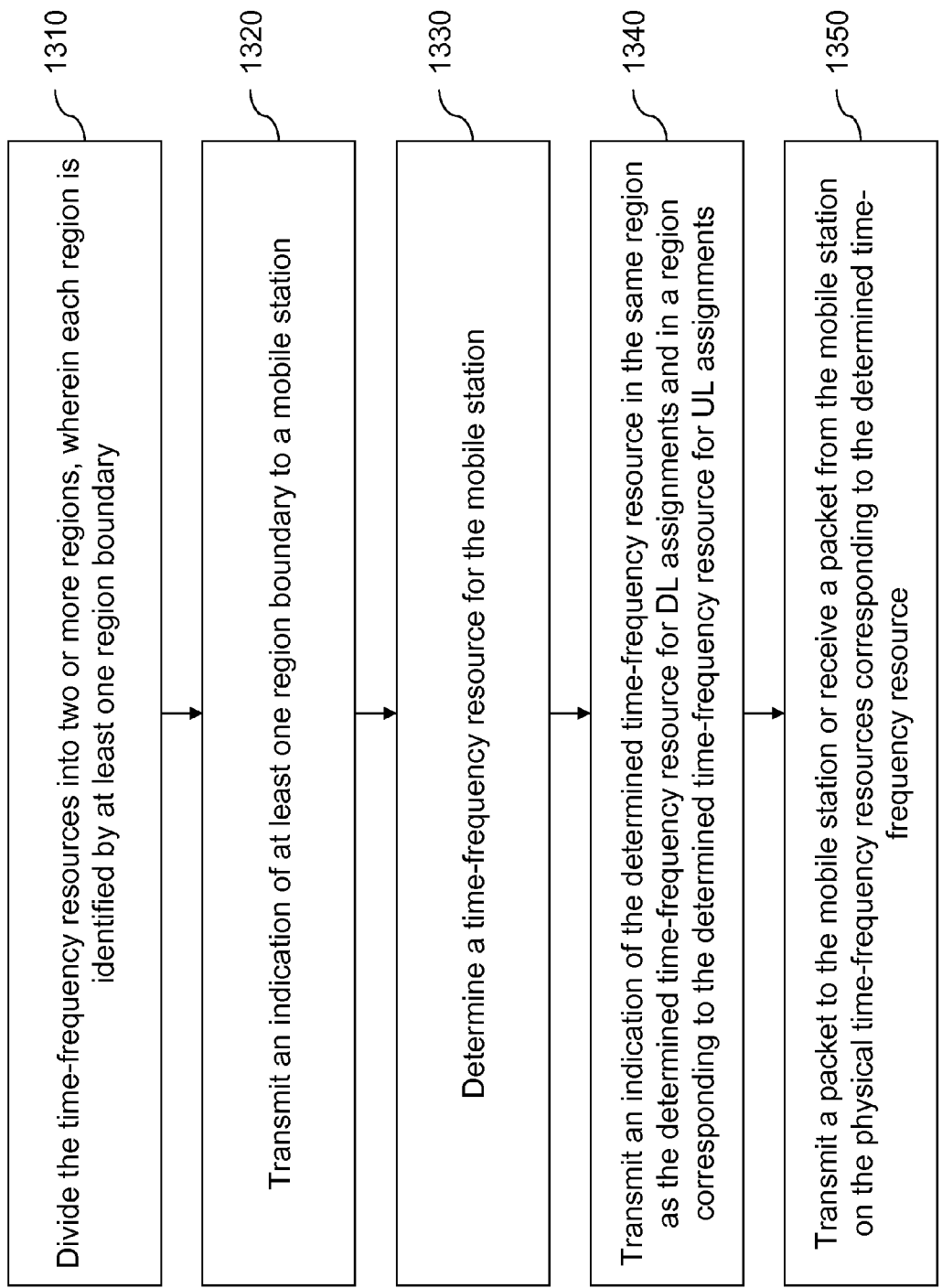
FIG. 13 is a flow chart for exemplary base station operation.

FIG. 13 is a flow chart for exemplary base station operation. At step 1310, a base station divides time-frequency resources into two or more regions, wherein each region is identified by at least one region boundary. The region boundaries can be an OFDM symbol number, an offset from another region, and the like. At step 1320, the base station transmits an indication of at least one region boundary to a mobile station. The indication can be sent on a control channel. Note that some region boundaries can be known at the mobile station or derived at the mobile station based on a parameter received from the base station. At step 1330, the base station determines a time-frequency resource assignment for a mobile station. The assignment is typically determined by a base station scheduler and can be an index to a channel tree, an explicit indication of OFDM symbols and OFDM subchannels, and the like. At step 1340, the base station transmits an indication of the determined time-frequency resource in the same region as the determined time-frequency resource for DL assignments and in a region corresponding to the determined time-frequency resource for UL assignments. At step 1350, the base station transmits a packet to the mobile station or receives a packet from the mobile station on the physical time-frequency resources corresponding to the determined time-frequency resource.

Figure 14:
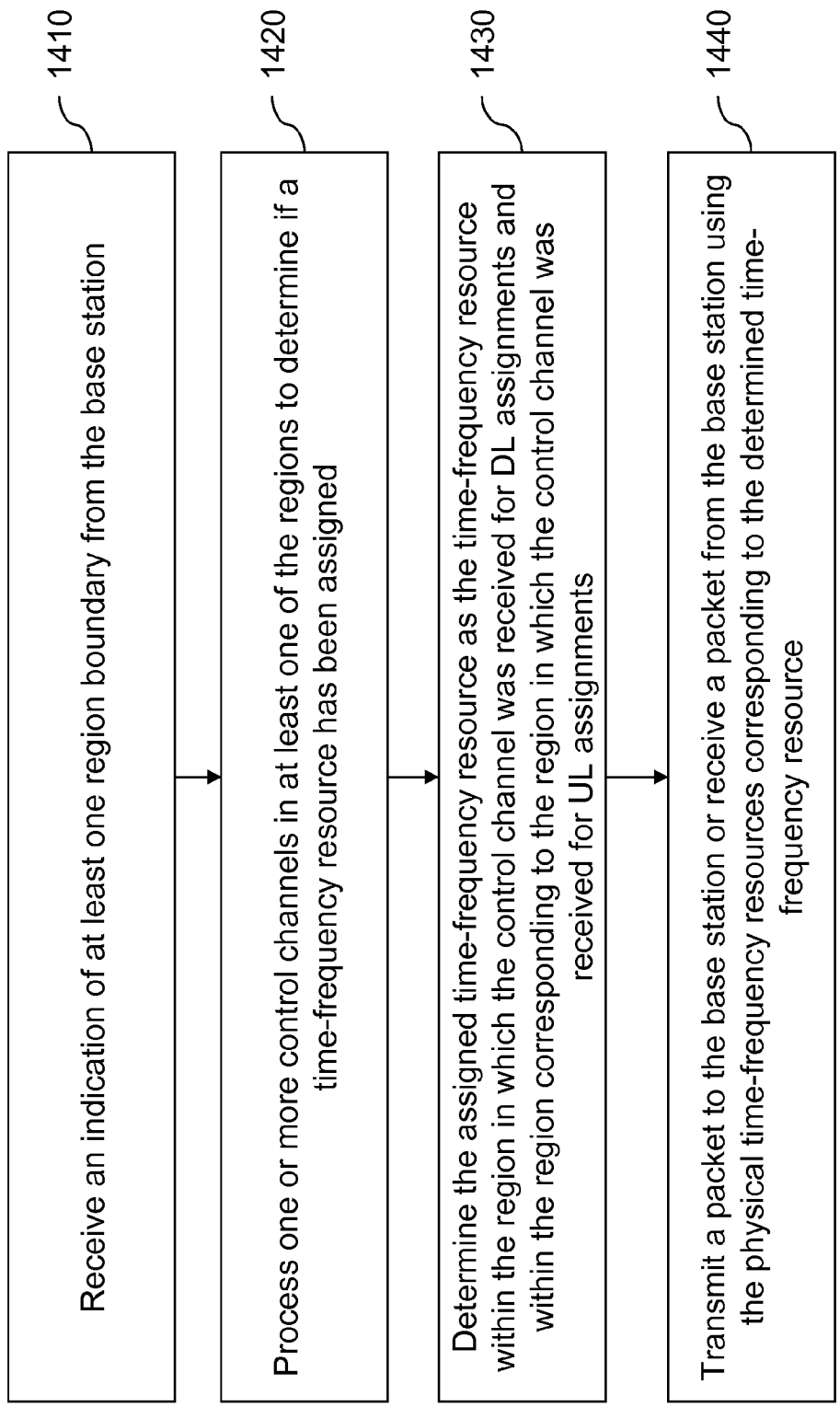
FIG. 14 is a flow chart for exemplary mobile station operation.

FIG. 14 is a flow chart for exemplary mobile station operation. At step 1410, the mobile station receives an indication of at least one region boundary from the base station. At step 1420, the mobile station processes one or more control channels in at least one of the regions to determine if a time-frequency resource has been assigned. The control channels can be DL assignment or UL assignments as previously described. At step 1430, the mobile station determines the assigned time-frequency resource as the time-frequency resource within the region in which the control channel was received for DL assignments and within the region corresponding to the region in which the control channel was received for UL assignments. At step 1440, the mobile station transmits a packet to the base station or receives a packet from the base station using the physical time-frequency resources corresponding to the determined time-frequency resource.

One skilled in the art will recognize that the terms base station, mobile station, and the like are intentionally general terms and are not to be interpreted as limited to a particular system, protocol, communications standard, or the like. Those skilled in the art will also recognize that the various methods and steps described herein can be accomplished by a radio device, such as a base station including either a general purpose or a special purpose processor appropriately programmed to accomplish, e.g., the presently described methods and steps. The base station preferably includes storage medium for storing programming instructions for the processor.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of assigning time-frequency resources in a wireless communication system, the method comprising:
   transmitting at least one region boundary to a mobile station, the at least one region boundary indicating a division of the time-frequency resources into at least two regions;
   determining a time-frequency resource assignment for the mobile station;
   transmitting an indication of the determined time-frequency resource assignment to the mobile station in a same region as the determined time-frequency resource; and
   transmitting a data packet to the mobile station using the physical time-frequency resources corresponding to the determined time-frequency resource in the same region of the determined time-frequency resource.

2. The method of claim 1, further comprising transmitting an indication of at least one preferred region to the mobile station.

3. The method of claim 1, wherein the wireless communication system is an orthogonal frequency division multiplexing based (OFDMA-based) system.

4. The method of claim 1, wherein transmitting an indication of the determined time-frequency resource assignment to the mobile station in the same region as the determined time-frequency resource includes transmitting at least one of:
   a connection identifier;
   a channel identifier;
   a MIMO parameter identifier; and
   a modulation coding parameter identifier.

5. The method of claim 1, wherein the at least two regions include a downlink region and an uplink region.

6. The method of claim 1, wherein the at least two regions include a downlink partial usage of subcarriers (PUSC) region, a downlink full usage of subcarriers (FUSC) region, and an uplink PUSC region.

7. The method of claim 1, wherein the at least two regions further includes a downlink control region.

8. The method of claim 7, further comprising transmitting an indication of the determined time-frequency resource assignment to a mobile station in the downlink control region.

9. The method of claim 1, further comprising identifying an OFDM symbol at which the at least one region boundary occurs.

10. A base station comprising:
    a processor;
    a computer readable medium storing programming for execution by the processor, the programming including instructions to:

define a first region and a second region of time-frequency resources, including defining a boundary between the first region and the second region of time-frequency resources;

direct a transmission of the definition of a first region and a second region of time-frequency resources to a mobile station during the first region of time-frequency resources;

define a time-frequency resource assignment for the mobile station;

direct a transmission of the definition of the time-frequency resource assignment to the mobile station during the first region of time-frequency resources; and direct a transmission of a data packet to the mobile station using the physical time-frequency resources corresponding to the determined time-frequency resources during the first region of time-frequency resources.

11. The base station of claim 10, wherein the processor is a collection of a plurality of processors working in concert.

12. The base station of claim 10, wherein defining a boundary between the first region and second region of time-frequency resources comprises identifying an OFDM symbol at which the boundary occurs.

13. The base station of claim 10, wherein the second region of time-frequency resources is defined relative to the end of the first region of time-frequency resources.

14. The base station of claim 10, wherein the programming further includes instructions to direct a transmission of an indication of at least one preferred region to the mobile station.

15. The base station of claim 10, wherein the base station is an orthogonal frequency division multiplexing (OFDMA) base station.

16. The base station of claim 10, wherein the programming including instructions to direct the transmission of the definition of the time-frequency resource assignment to the mobile station during the first region of time-frequency resources further includes instructions to transmit at least one of:

a connection identifier;
a channel identifier;
a MIMO parameter identifier; and
a modulation coding parameter identifier.

17. The base station of claim 10, wherein the first and second regions include a downlink region and an uplink region.

18. The base station of claim 10, wherein the first and second regions comprise regions selected from the group consisting of a downlink partial usage of subcarriers (PUSC) region, a downlink full usage of subcarriers (FUSC) region, an uplink PUSC region, a control region, an uplink legacy region.

19. The base station of claim 10, wherein the first and second regions include a downlink control region.

20. The base station of claim 18, wherein the programming including instructions to direct the transmission of the definition of the time-frequency resource assignment to the mobile station during the first region of time-frequency resources further includes instructions to direct the transmission in the downlink control region.

* * * * *